(12) United States Patent
Prasad et al.

(10) Patent No.: US 12,538,316 B2
(45) Date of Patent: Jan. 27, 2026

(54) TIME DOMAIN RESOURCE ALLOCATION FOR MULTICAST BROADCAST SERVICE

(71) Applicant: Nokia Technologies Oy, Espoo (FI)

(72) Inventors: Athul Prasad, Naperville, IL (US); David Bhatoolaul, Swindon (GB); Naizheng Zheng, Beijing (CN); David Navrátil, Helsinki (FI); Ugur Baran Elmali, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 492 days.

(21) Appl. No.: 17/962,813

(22) Filed: Oct. 10, 2022

(65) Prior Publication Data

US 2023/0146999 A1    May 11, 2023

(30) Foreign Application Priority Data

Nov. 5, 2021  (WO) ................ PCT/CN2021/128929

(51) Int. Cl.
*H04W 72/23*  (2023.01)
*H04W 72/0446*  (2023.01)
(Continued)

(52) U.S. Cl.
CPC ....... *H04W 72/23* (2023.01); *H04W 72/0446* (2013.01); *H04W 72/30* (2023.01); *H04W 76/20* (2018.02)

(58) Field of Classification Search
CPC . H04W 72/0446; H04W 72/23; H04W 72/30; H04W 76/20
See application file for complete search history.

(56) References Cited

U.S. PATENT DOCUMENTS 10,645,701 B2 *  5/2020  Baldemair ............ H04W 72/53
10,939,450 B2 *  3/2021  Baldemair ............ H04L 5/0094
(Continued)

FOREIGN PATENT DOCUMENTS

CN    110351848 A    10/2019
CN    110720248 A    1/2020
(Continued)

OTHER PUBLICATIONS

Extended European Search Report received for corresponding European Patent Application No. 22199331.4, dated Mar. 6, 2023, 8 pages.
(Continued)

*Primary Examiner* — Eric Nowlin
(74) *Attorney, Agent, or Firm* — SQUIRE PATTON BOGGS (US) LLP

(57) ABSTRACT

Embodiments of the present disclosure relate to time domain resource allocation for multicast broadcast service. A first device receives, from a second device, DCI comprising a TDRA field, and determines, based on at least one of an identifier for scrambling the DCI, a RRC state of the first device or a type of traffic configured for the first device, a TDRA list from a set of configurations for TDRA. Then the first device applies, based on the TDRA list, the TDRA field for reception of the traffic from the second device. In this way, a TDRA list to be used may be determined in an optimal manner, with all terminal devices receiving multicast and broadcast traffic determining common values for time domain resources where data traffic would be scheduled.

18 Claims, 7 Drawing Sheets

(51) Int. Cl.
*H04W 72/30* (2023.01)
*H04W 76/20* (2018.01)

(56) References Cited

U.S. PATENT DOCUMENTS

| | | | | |
|---|---|---|---|---|
| 11,096,180 | B2* | 8/2021 | Baldemair | H04W 76/11 |
| 11,963,160 | B2* | 4/2024 | Zhang | H04L 1/1887 |
| 12,256,372 | B2* | 3/2025 | Wei | H04L 5/0037 |
| 12,376,132 | B2* | 7/2025 | Liu | H04W 4/06 |
| 2019/0159213 | A1* | 5/2019 | Baldemair | H04L 5/0094 |
| 2020/0245338 | A1* | 7/2020 | Baldemair | H04W 72/23 |
| 2021/0014861 | A1* | 1/2021 | Wang | H04L 69/324 |
| 2021/0045017 | A1* | 2/2021 | Takeda | H04W 76/27 |
| 2021/0153206 | A1* | 5/2021 | Baldemair | H04L 5/0053 |
| 2022/0022162 | A1* | 1/2022 | Liu | H04W 4/06 |
| 2022/0116962 | A1* | 4/2022 | Zhang | H04L 5/0044 |
| 2022/0217718 | A1* | 7/2022 | Hu | H04L 1/1812 |
| 2022/0272662 | A1* | 8/2022 | Kim | H04W 72/23 |
| 2022/0361161 | A1* | 11/2022 | Wei | H04W 72/30 |
| 2023/0146999 | A1* | 5/2023 | Prasad | H04W 76/20 370/329 |
| 2023/0362967 | A1* | 11/2023 | Baldemair | H04L 5/0053 |
| 2024/0235745 | A1* | 7/2024 | Yoshioka | H04L 1/1896 |
| 2025/0097968 | A1* | 3/2025 | Baldemair | H04L 5/0053 |

FOREIGN PATENT DOCUMENTS

| | | | | |
|---|---|---|---|---|
| CN | 112020842 | A | | 12/2020 |
| CN | 112637784 | A | | 4/2021 |
| CN | 113347688 | A | | 9/2021 |
| CN | 116095857 | A * | | 5/2023 ........... H04W 72/30 |
| CN | 116158173 | A * | | 5/2023 ........... H04W 72/30 |
| CN | 116391442 | A * | | 7/2023 ........... H04W 72/30 |
| CN | 117242820 | A * | | 12/2023 ........... H04L 1/1822 |
| CN | 117280743 | A * | | 12/2023 ........... H04L 1/1896 |
| CN | 117716765 | A * | | 3/2024 ........... H04L 5/0053 |
| EP | 3691170 | A1 * | | 8/2020 ........... H04W 72/53 |
| EP | 3761738 | A1 * | | 1/2021 ........... H04W 72/23 |
| EP | 3691170 | B1 * | | 8/2021 ........... H04W 72/23 |
| EP | 4178300 | A1 * | | 5/2023 ........... H04W 72/30 |
| EP | 4340442 | A1 * | | 3/2024 ........... H04L 1/1822 |
| EP | 4383886 | A1 * | | 6/2024 ........... H04L 5/0053 |
| JP | 7701440 | B2 * | | 7/2025 ........... H04L 1/1896 |
| KR | 20230092935 | A * | | 6/2023 ........... H04W 72/30 |
| WO | 2021/029753 | A1 | | 2/2021 |
| WO | 2021/057829 | A1 | | 4/2021 |
| WO | 2021/197224 | A1 | | 10/2021 |
| WO | WO-2022020204 | A1 * | | 1/2022 ............. H04W 4/06 |
| WO | WO-2022080902 | A1 * | | 4/2022 ........... H04W 72/23 |
| WO | WO-2022086294 | A1 * | | 4/2022 ........... H04W 72/30 |
| WO | WO-2022155321 | A1 * | | 7/2022 ........... H04L 1/1854 |
| WO | WO-2022239084 | A1 * | | 11/2022 ........... H04W 28/04 |
| WO | WO-2022239086 | A1 * | | 11/2022 ........... H04L 1/1822 |
| WO | WO-2023287160 | A1 * | | 1/2023 ........... H04L 1/1812 |
| WO | WO-2023012982 | A1 * | | 2/2023 ........... H04L 5/0053 |

OTHER PUBLICATIONS

"[Post-106-e-Re117-RRC-12] Summary of email discussion on RRC parameters for NR MBS", 3GPP TSG RAN WG1 #106-e, R1-2108686, Agenda: 8.12, CMCC, Aug. 16-27, 2021, 15 pages.
"3rd Generation Partnership Project; Technical Specification Group Radio Access Network; NR; Physical layer procedures for data (Release 16)", 3GPP TS 38.214, V16.7.0, Sep. 2021, pp. 1-172.
"WID revision: NR Multicast and Broadcast Services", 3GPP TSG RAN Meeting #88-e, RP-201038, Agenda: 9.10.8, Huawei, Jun. 29-Jul. 3, 2020, 6 pages.
Alepuz et al., "LTE-Advanced Pro Broadcast Radio Access Network Benchmark", 5G Xcast, Document No. D3.1, Version v1.1, Jun. 29, 2018, 140 pages.
"Summary#1 on mechanisms to support group scheduling for RRC_Connected UEs for NR MBS", 3GPP TSG RAN WG1 #105-e, R1-2105973, Agenda: 8.12.1, CMCC, May 10-27, 2021, pp. 1-71.
"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
International Search Report and Written Opinion received for corresponding Patent Cooperation Treaty Application No. PCT/CN2021/128929, dated Jul. 27, 2022, 9 pages.
Chinese Office Action issued in corresponding Chinese Patent Application No. 2022113750388 on Sep. 26, 2025.

* cited by examiner

TIME DOMAIN RESOURCE ALLOCATION FOR MULTICAST BROADCAST SERVICE

RELATED APPLICATION

This application claims priority from PCT Application PCT/CN2021/128929, filed on Nov. 5, 2021, which is incorporated herein by reference in its entirety.

FIELD

Embodiments of the present disclosure generally relate to the field of telecommunication and in particular, to a method, device and computer readable storage medium of communication in time domain resource allocation (TDRA) for multicast broadcast service (MBS).

BACKGROUND

With development of a new radio (NR) multicast technology, third generation partnership project (3GPP) is currently defining mechanisms for enabling the delivery of multicast traffic and/or broadcast traffic to a multitude of terminal devices. One key aim is to define group scheduling mechanisms that enable the multicast traffic and/or broadcast traffic to be scheduled using common data channel resources, while maintaining maximum commonalities with the currently defined unicast scheduling and operation mechanisms.

Currently, it is agreed that downlink control information (DCI) formats 1_0 and 1_1 used for scheduling unicast traffic, could be used as baseline for scheduling multicast traffic physical downlink shared channel (PDSCH) resources. A TDRA field within DCI informs the terminal device which field within a pre-defined set of TDRA lists should be applied. For NR MBS, it is still to be studied how to apply an appropriate configuration for determining which TDRA list to utilize.

SUMMARY

In general, example embodiments of the present disclosure provide a solution for enabling a terminal device to select the applicable time domain resource allocation table for MBS.

In a first aspect, there is provided a first device. The first device comprises: at least one processor; and at least one memory including computer program code; the at least one memory and the computer program code are configured to, with the at least one processor, cause the first device to: receive, from a second device, downlink control information comprising a time domain resource allocation field; determine, based on at least one of an identifier for scrambling the downlink control information, a radio resource control state of the first device or a type of traffic configured for the first device, a time domain resource allocation list from a set of configurations for time domain resource allocation; and apply, based on the time domain resource allocation list, the time domain resource allocation field for reception of the traffic from the second device.

In a second aspect, there is provided a second device. The second device comprises: at least one processor; and at least one memory including computer program code; the at least one memory and the computer program code are configured to, with the at least one processor, cause the second device to: transmit, to a first device, downlink control information comprising a time domain resource allocation field; determine, based on at least one of an identifier for scrambling the downlink control information, a radio resource control state of the first device or a type of traffic configured for the first device, a time domain resource allocation list from a set of configurations for time domain resource allocation; and apply, based on the time domain resource allocation list, the time domain resource allocation field for transmission of the traffic to the first device.

In a third aspect, there is provided a method of communication. The method comprises: receiving, at a first device and from a second device, downlink control information comprising a time domain resource allocation field; determining, based on at least one of an identifier for scrambling the downlink control information, a radio resource control state of the first device or a type of traffic configured for the first device, a time domain resource allocation list from a set of configurations for time domain resource allocation; and applying, based on the time domain resource allocation list, the time domain resource allocation field for reception of the traffic from the second device.

In a fourth aspect, there is provided a method of communication. The method comprises: transmitting, at a second device and to a first device, downlink control information comprising a time domain resource allocation field; determining, based on at least one of an identifier for scrambling the downlink control information, a radio resource control state of the first device or a type of traffic configured for the first device, a time domain resource allocation list from a set of configurations for time domain resource allocation; and applying, based on the time domain resource allocation list, the time domain resource allocation field for transmission of the traffic to the first device.

In a fifth aspect, there is provided an apparatus of communication. The apparatus comprises: means for receiving, at a first device and from a second device, downlink control information comprising a time domain resource allocation field; means for determining, based on at least one of an identifier for scrambling the downlink control information, a radio resource control state of the first device or a type of traffic configured for the first device, a time domain resource allocation list from a set of configurations for time domain resource allocation; and means for applying, based on the time domain resource allocation list, the time domain resource allocation field for reception of the traffic from the second device.

In a sixth aspect, there is provided an apparatus of communication. The apparatus comprises: means for transmitting, at a second device and to a first device, downlink control information comprising a time domain resource allocation field; means for determining, based on at least one of an identifier for scrambling the downlink control information, a radio resource control state of the first device or a type of traffic configured for the first device, a time domain resource allocation list from a set of configurations for time domain resource allocation; and means for applying, based on the time domain resource allocation list, the time domain resource allocation field for transmission of the traffic to the first device.

In a seventh aspect, there is provided a non-transitory means for computer readable medium. The non-transitory computer readable medium comprises program instructions for causing an apparatus to perform the method according to the third aspect.

In an eighth aspect, there is provided a non-transitory computer readable medium. The non-transitory computer readable medium comprises program instructions for causing an apparatus to perform the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
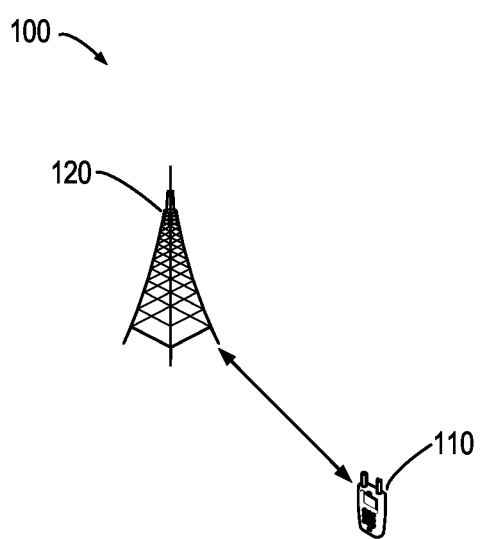
FIG. 1 illustrates an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standard, such as fifth generation (5G) systems, fifth generation-advanced (5G-Advanced) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocol, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), a Mobile Terminal (MT), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

The term "multicast traffic" as used herein implies traffic delivered to a group of users interested in receiving the traffic, and also implies data that is sent over the air and received by all users interested in receiving the traffic. In other words, the multicast traffic as used herein may also cover both multicast and broadcast services. In the following description, the terms "multicast traffic", "multicast service", "broadcast traffic", "broadcast service" and "multicast broadcast service (MBS)" may be used interchangeably.

As known, DCI formats 1_0, 1_1 and 1_2 are used by a network device to inform a terminal device about the PDSCH resources where downlink data would be scheduled. Currently these formats have been defined for unicast traffic, which implies that the network device would utilize either of these DCI formats to inform a terminal device about upcoming scheduled downlink information over PDSCH using a physical downlink control channel (PDCCH) specific to the terminal device. As mentioned above, it is agreed that DCI formats 1_0 and 1_1 could be used as baseline for scheduling multicast traffic PDSCH resources, with the use of a common identifier—called group-common radio network temporary identifier (G-RNTI) to scramble the control information. This enables a group of users to receive the downlink control information.

In this case, the network device would be using group-common PDCCH resources for sending the DCI with cyclic redundancy check (CRC) scrambled using a group-common RNTI value which is possibly configured by higher layers. These PDCCH resources would be configured using a new type of search space set which could be dedicated to schedule the control information for multicast and/or broadcast traffic. The search space sets are called Type-X, Type-3A or multicast or broadcast search space sets.

A TDRA field within DCI informs a terminal device which field within a pre-defined set of TDRA lists should be applied. Based on certain priorities, currently different higher layer configurations such as PDSCH-Config or PDSCH-ConfigCommon are applied for computing which TDRA list should be used by the terminal device to interpret the TDRA field. For NR MBS, a higher layer configuration PDSCH-Config-Multicast is expected to be applied.

However, PDSCH-Config-Multicast is a parameter configured using RRC once a terminal device establishes a RRC connection with a network device. For a terminal device in an idle or inactive state, currently there are no such configurations provided, since the terminal device does not have an active RRC connection with the network device. This leads to an issue for Type-X common search space (CSS) as shown in Table 1, where if a UE is simultaneously configured with multicast and broadcast traffic with two different G-RNTIs, the UE cannot choose a TDRA table (also referred to as TDRA list herein) which could be applied to multicast and broadcast DCIs.

TABLE 1

An issue in applicable PDSCH time domain resource allocation for DCI formats 1_0 and 1_1

| RNTI | PDCCH search space | SS/PBCH block and CORESET multiplexing pattern | PDSCH-ConfigCommon includes pdsch-TimeDomainAl-locationList | PDSCH-Config includes pdsch-TimeDomainAl-locationList | PDSCH time domain resource allocation to apply |
|---|---|---|---|---|---|
| SI-RNTI | Type0 common | 1 | — | — | Default A for normal CP |
|  |  | 2 | — | — | Default B |
|  |  | 3 | — | — | Default C |

TABLE 1-continued

An issue in applicable PDSCH time domain resource allocation for DCI formats 1_0 and 1_1

| RNTI | PDCCH search space | SS/PBCH block and CORESET multiplexing pattern | PDSCH-ConfigCommon includes pdsch-TimeDomainAl-locationList | PDSCH-Config includes pdsch-TimeDomainAl-locationList | PDSCH time domain resource allocation to apply |
|---|---|---|---|---|---|
| SI-RNTI | Type0A common | 1 | No | — | Default A |
| | | 2 | No | — | Default B |
| | | 3 | No | — | Default C |
| | | 1, 2, 3 | Yes | — | pdsch-TimeDomainAl-locationList provided in PDSCH-ConfigCommon |
| RA-RNTI, MSGB-RNTI, TC-RNTI | Type1 common | 1, 2, 3 | No | — | Default A |
| | | 1, 2, 3 | Yes | — | pdsch-TimeDomainAl-locationList provided in PDSCH-ConfigCommon |
| P-RNTI | Type2 common | 1 | No | — | Default A |
| | | 2 | No | — | Default B |
| | | 3 | No | — | Default C |
| | | 1, 2, 3 | Yes | — | pdsch-TimeDomainAl-locationList provided in PDSCH-ConfigCommon |
| G-RNTI, GS-RNTI (Option-1) | Type X common | 1 | No | — | Default A |
| | | 2 | No | — | Default B |
| | | 3 | No | — | Default C |
| | | 1, 2, 3 | ? | = | pdsch-TimeDomainAl-locationList provided in ????? |
| C-RNTI, MCS-C-RNTI, CS-RNTI | Any common search space associated with CORESET 0 | 1, 2, 3 | No | — | Default A |
| | | 1, 2, 3 | Yes | — | pdsch-TimeDomainAl-locationList provided in PDSCH-ConfigCommon |
| C-RNTI, MCS-C-RNTI, CS-RNTI, G-RNTI, G-CS-RNTI (Option-2) | Any common search space not associated with CORESET 0 UE specific search space | 1, 2, 3 | No | No | Default A |
| | | 1, 2, 3 | Yes | No | pdsch-TimeDomainAl-locationList provided in PDSCH-ConfigCommon (Note 1) |
| | | 1, 2, 3 | No/Yes | Yes | pdsch-TimeDomainAl-locationList provided in PDSCH-Config |

(Note 1):
For G-RNTI and G-CS-RNTI PDSCH time domain resource allocation should be applied using the parameters provided in PDSCH-Config-Multicast, if configured Currently, Type-X CSS is a new common search space defined for broadcast and multicast. For multicast, it is agreed that for CSS of group-common PDCCH of point-to-multipoint (PTM) scheme 1—whereby a group-common PDCCH is used to schedule group-common PDSCH for multicast in a RRC_CONNECTED state, a Type-X CSS is supported. The monitoring priority of Type-X CSS is determined based on the search space set indexes of the Type-x CSS set and UE-specific search space (USS) sets, regardless of which DCI format of group-common PDCCH is configured in the Type-X CSS.

As shown in Table 1 for Type-X CSS, the issue to be addressed is how to identify an appropriate TDRA list to be utilized for interpreting a TDRA field in DCI while simultaneously receiving multicast and broadcast traffic, using G-RNTI. Currently, the UE can either use option-1 or option-2 shown in the table. Based on the currently proposed specification update, in case PDSCH-Config-Multicast is not configured, a terminal device in a connected state receiving multicast/unicast and broadcast traffic might utilize a TDRA list provided in PDSCH-Config, but a terminal device receiving only broadcast traffic would utilize a TDRA list provided in PDSCH-ConfigCommon, leading to two different TDRA tables being used which in turn leads to misinterpretation of the TDRA field received within the DCI.

In view of this, embodiments of the present disclosure provide an improved solution for communication. In the solution, a TDRA list is determined from a set of configurations for TDRA based on an identifier for scrambling DCI, a RRC state of a terminal device and a type of traffic configured for the terminal device. Then, a TDRA field in the DCI the TDRA list is applied in the TDRA list to determine a time domain resource for transmission or reception of the traffic. In this way, a terminal device in a connected state receiving multicast/unicast and broadcast traffic and a terminal device receiving only broadcast traffic may be enabled to interpret a common TDRA list to be used. Accordingly, a significant flexibility to schedule MBS may be provided with optimal functioning of the time domain resource allocation, and a significant complexity reduction to a terminal device may be provided.

Principles and implementations of the present disclosure will be described in detail below with reference to the figures.

FIG. 1 illustrates an example communication network 100 in which embodiments of the present disclosure can be implemented. As shown in FIG. 1, the network 100 includes a first device 110 and a second device 120 serving the first device 110. It is to be understood that the number of the first and second devices as shown in FIG. 1 are only for the purpose of illustration without suggesting any limitations. The network 100 may include any suitable number of first and second devices adapted for implementing embodiments of the present disclosure. In some embodiments, the first device 110 may be a terminal device, and the second device 120 may be a network device.

Merely for illustration purposes and without suggesting any limitations as to the scope of the present disclosure, some embodiments will be described in the context where the first device 110 is a terminal device and the second device 120 is a network device. It is to be understood that, in other embodiments, the first device 110 may be a network device and the second device 120 may be a terminal device. In other words, the principles and spirit of the present disclosure may be applied to both uplink and downlink transmissions.

As shown in FIG. 1, the first device 110 and the second device 120 may communicate with each other via a wireless communication channel. The communications within the network 100 may conform to any suitable standard including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) or the sixth generation (6G) communication protocols.

In some scenarios, the second device 120 may transmit any of multicast traffic, unicast traffic and broadcast traffic to the first device 110. For example, the second device 120 may transmit broadcast and multicast traffic to the first device 110. In some scenarios, the second device 120 may transmit DCI to the first device 110 to schedule the traffic. The DCI may comprise a TDRA field. The first device 110 may interpret the TDRA field to determine a time domain resource, and receive the traffic based on the time domain resource.

Embodiments of the present disclosure provide a mechanism for applying or interpreting the TDRA field in an appropriate TDRA list so that terminal devices receiving different types of traffic have a common understanding of the TDRA field. This mechanism of the present disclosure is illustrated in a high-level flowchart as shown in FIG. 2.

Figure 2:
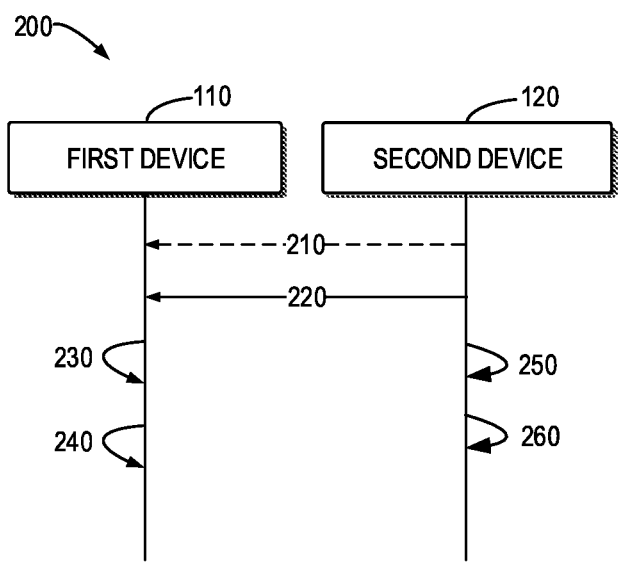
FIG. 2 illustrates a diagram illustrating a process of communication according to some embodiments of the present disclosure.

FIG. 2 illustrates a flowchart illustrating a process 200 of communication according to some embodiments of the present disclosure. For convenience, FIG. 2 will be described in connection with the example of FIG. 1.

As shown in FIG. 2, the second device 120 may transmit 210 a set of configurations for TDRA to the first device 110. In some embodiments, the set of configurations may be a set of higher layer configurations such as a set of RRC configurations. Of course, any other suitable forms are also feasible. In some embodiments, the set of configurations may comprise at least one of the following: a PDSCH-Config-Multicast configuration, a PDSCH-ConfigCommon configuration, a PDSCH-Config configuration, default A, B or C tables. It is to be understood that any other suitable configurations existing or to be developed in future are also feasible.

Each of the configurations comprises a predetermined TDRA list. For example, PDSCH-Config-Multicast configuration comprises pdsch-TimeDomainAllocationList-Multicast. PDSCH-Config-Broadcast configuration comprises pdsch-TimeDomainAllocationList-Broadcast. PDSCH-Config configuration comprises pdsch-TimeDomainAllocationList. Of course, any other suitable forms are also feasible.

When traffic is to be transmitted, the second device 120 transmits 220 DCI comprising a TDRA field to the first device 110. It is to be understood that the DCI may comprise any suitable additional fields, and the present disclosure does not limit this aspect.

Upon reception of the DCI, the first device 110 determines 230 a TDRA list from the set of configurations for TDRA based on at least one of the following: an identifier for scrambling the DCI, a RRC state of the first device 110, or a type of traffic configured for the first device. In this way, different devices configured with the reception of different types of traffic have a common understanding of the TDRA field for multicast and broadcast.

In some embodiments, a search space set type may configure the resources where the DCI may be sent along with the identifiers used for scrambling the DCI.

In some embodiments, the identifier for scrambling the DCI may be an identifier used to scramble CRC of the DCI. For example, the identifier may be a radio network temporary identity (RNTI) such as cell-RNTI (C-RNTI), group-RNTI (G-RNTI), group-common configured scheduling-RNTI (G-CS-RNTI), or single-cell-RNTI (SC-RNTI). It is to be understood that these are merely examples, and any other suitable identifiers are also feasible.

In some embodiments, the RRC state of the first device 110 may be a connected state such as a RRC_CONNECTED state or mode. In some embodiments, the RRC state of the first device 110 may be an idle state such as a RRC_IDLE state or mode. In some embodiments, the RRC state of the first device 110 may be an inactive state such as a RRC_INACTIVE state or mode.

In some embodiments, the type of traffic may be at least one of multicast traffic, broadcast traffic or unicast traffic.

Upon determination of the TDRA list, the first device 110 applies 240 the TDRA field based on the TDRA list to determine a time domain resource for reception of the traffic. The applying of the TDRA field may be implemented in any suitable ways and the present disclosure does not limit this aspect.

As shown in FIG. 2, after the transmission of the DCI, the second device 120 also determines 250 the TDRA list from the set of configurations based on at least one of the identifier for scrambling the DCI, the RRC state of the first device 110, or the type of traffic configured for the first device 110. The operations of the determining 250 are similar as that of the determining 230.

Upon determination of the TDRA list, the second device 120 also applies 260 the TDRA field based on the TDRA list to determine the time domain resource for transmission of the traffic. The operations of the applying 260 are similar as that of the applying 240. The applying of the TDRA field may be implemented in any suitable ways and the present disclosure does not limit this aspect.

For illustration, some example embodiments for the determination of the TDRA list will be described in connection with Embodiments 1 to 3.

Embodiment 1

In this embodiment, the TDRA list is determined based on the identifier for scrambling the DCI, the radio resource control state of the first device 110 or the type of traffic configured for the first device 110. This will be described with reference to FIG. 3A.

Figure 3A:
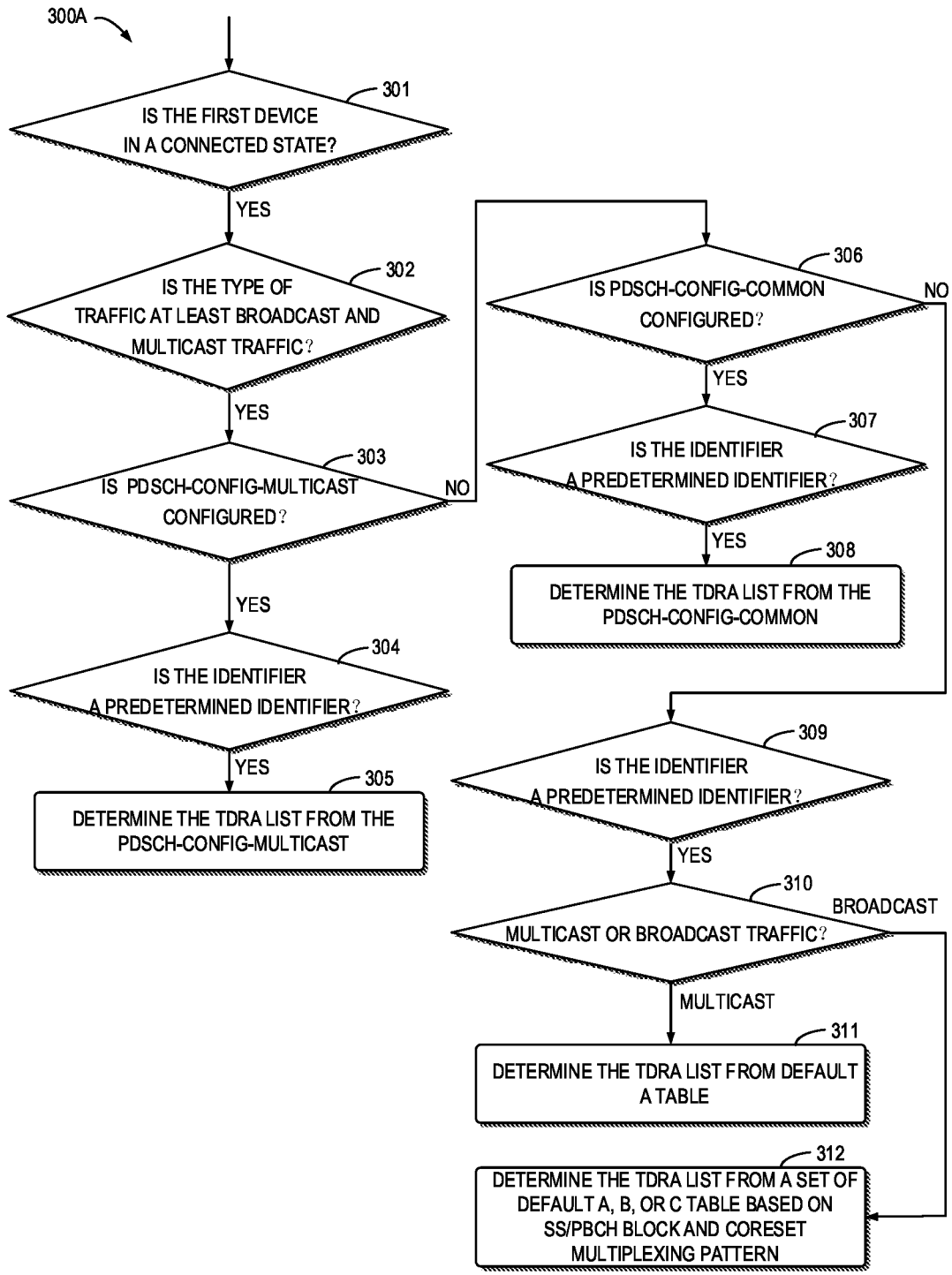
FIG. 3A illustrates a flowchart illustrating a method of determining a TDRA list according to example embodiments of the present disclosure.

FIG. 3A illustrates a flowchart illustrating a method 300A of determining a TDRA list according to example embodiments of the present disclosure. The method 300A can be implemented at the first device 110 or the second device 120 shown in FIG. 1. For the purpose of discussion, the method 300A will be described in connection with the first device 110 in FIG. 1. It is to be understood that the method 300A may also be implemented at the second device 120. It is also to be understood that the method 300A may further include additional blocks not shown and/or omit some shown blocks, and the scope of the present disclosure is not limited in this regard.

As shown in FIG. 3A, at block 301, the first device 110 may determine whether the first device 110 is in a connected state. If the first device 110 is in the connected state, the process proceeds to block 302.

At block 302, the first device 110 may determine whether the type of traffic is at least broadcast and multicast traffic. For example, the first device 110 may determine whether the first device 110 is configured to receive broadcast and multicast traffic. In another example, the first device 110 may determine whether the first device 110 is configured to receive broadcast, multicast and unicast traffic. If the type of traffic is broadcast and multicast traffic, or if the type of traffic is broadcast, multicast and unicast traffic, the process 300A proceeds to block 303.

At block 303, the first device 110 may determine whether a PDSCH-Config-Multicast configuration (for convenience, also referred to as a first configuration herein) is configured for the first device 110. If the PDSCH-Config-Multicast configuration is configured, the process 300A proceeds to block 304.

At block 304, the first device 110 may determine whether the identifier is a predetermined identifier. In other words, the first device 110 may determine whether the DCI is scrambled by the predetermined identifier. For example, the first device 110 may determine whether CRC of the DCI is scrambled by the predetermined identifier. In some embodiments, the predetermined identifier may be a G-RNTI. In some embodiments, the predetermined identifier may be a G-CS-RNTI. Of course, the predetermined identifier may adopt any other suitable forms.

If the identifier is a predetermined identifier, the process 300A proceeds to block 305. At block 305, the first device 110 may determine the TDRA list from the PDSCH-Config-Multicast configuration. For example, the first device 110 may determine, as the TDRA list, a TDRA list such as pdsch-TimeDomainAllocationList-Multicast provided in the PDSCH-Config-Multicast configuration.

Return to block 303, if determining that the PDSCH-Config-Multicast configuration is not configured, the process 300A proceeds to block 306. At block 306, the first device 110 may determine whether a PDSCH-Config-Common configuration (for convenience, also referred to as a second configuration herein) is configured for the first device 110. If the PDSCH-Config-Common configuration is configured, the process 300A proceeds to block 307.

At block 307, the first device 110 may determine whether the identifier is a predetermined identifier. In other words, the first device 110 may determine whether the DCI is scrambled by the predetermined identifier. For example, the first device 110 may determine whether CRC of the DCI is scrambled by the predetermined identifier. In some embodiments, the predetermined identifier may be a G-RNTI. In some embodiments, the predetermined identifier may be a G-CS-RNTI. Of course, the predetermined identifier may adopt any other suitable forms.

If the identifier is a predetermined identifier, the process 300A proceeds to block 308. At block 308, the first device 110 may determine the TDRA list from the PDSCH-Config-Common configuration.

Return to block 306, if determining that the PDSCH-Config-Common configuration is not configured, the process 300A proceeds to block 309. At block 309, the first device 110 may determine whether the identifier is a predetermined identifier. In other words, the first device 110 may determine whether the DCI is scrambled by the predetermined identifier. For example, the first device 110 may determine whether CRC of the DCI is scrambled by the predetermined identifier. In some embodiments, the predetermined identifier may be a G-RNTI. In some embodiments, the predetermined identifier may be a G-CS-RNTI. Of course, the predetermined identifier may adopt any other suitable forms.

If the identifier is a predetermined identifier, the process 300A proceeds to block 310. At block 310, the first device 110 may determine whether the predetermined identifier is associated with multicast traffic or broadcast traffic.

If the predetermined identifier is associated with multicast traffic, the process 300A proceeds to block 311. At block 311, the first device 110 may determine the TDRA list from a default A table (for convenience, also referred to as a third configuration herein).

If the predetermined identifier is associated with broadcast traffic, the process 300A proceeds to block 312. At block 312, the first device 110 may determine the TDRA list from a set of default A, B and C tables (for convenience, also referred to as a fourth configuration herein) based on a synchronization signal (SS)/physical broadcast channel (PBCH) block and control resource set (CORESET) multiplexing pattern. For example, the first device 110 may determine the TDRA list from the default A, B or C table based on a SS/PBCH block and CORESET multiplexing pattern.

Embodiment 2

This embodiment is a modification of Embodiment 1. This embodiment provides an alternative for blocks 306 to 312 of FIG. 3A. In this embodiment, the first device 110 may receive, from the second device 120, an indication indicating whether a PDSCH-Config-Common configuration (i.e., the second configuration) or a PDSCH-Config configuration (for convenience, also referred to as a fifth configuration herein) is used for the determination of the TDRA list. The indication may be carried in any suitable forms.

Figure 3B:
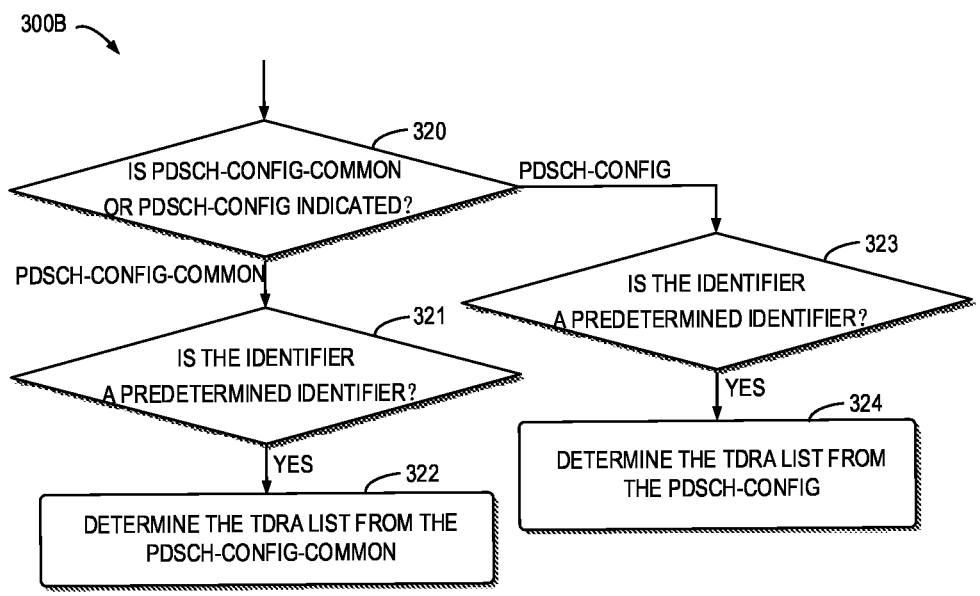
FIG. 3B illustrates a flowchart illustrating another method of determining a TDRA list according to example embodiments of the present disclosure.

The details of this embodiment will be described with reference to FIG. 3B. FIG. 3B illustrates a flowchart illustrating another method 300B of determining a TDRA list according to example embodiments of the present disclosure. The method 300B can be implemented at the first device 110 or the second device 120 shown in FIG. 1. For the purpose of discussion, the method 300B will be described in connection with the first device 110 in FIG. 1. It is to be understood that the method 300B may also be implemented at the second device 120. It is also to be understood that the method 300B may further include additional blocks not shown and/or omit some shown blocks, and the scope of the present disclosure is not limited in this regard.

If determining at block 303 in FIG. 3A that the PDSCH-Config-Multicast configuration (i.e., the first configuration) is not configured, the process 300B may start.

As shown in FIG. 3B, at block 320, the first device 110 may determine whether the PDSCH-Config-Common configuration or PDSCH-Config configuration is used based on the indication. If the PDSCH-Config-Common configuration is used, the process 300B proceeds to block 321.

At block 321, the first device 110 may determine whether the identifier is a predetermined identifier. In other words, the first device 110 may determine whether the DCI is scrambled by the predetermined identifier. For example, the first device 110 may determine whether CRC of the DCI is scrambled by the predetermined identifier. In some embodiments, the predetermined identifier may be a G-RNTI. In some embodiments, the predetermined identifier may be a G-CS-RNTI. Of course, the predetermined identifier may adopt any other suitable forms. In some embodiments, the predetermined identifier may be associated with multicast traffic. In some embodiments, the predetermined identifier may be associated with broadcast traffic.

If the identifier is the predetermined identifier, the process 300B proceeds to block 322. At block 322, the first device 110 may determine the TDRA list from the PDSCH-Config-Common configuration. In other words, if the first device 110 is not configured with PDSCH-Config-Multicast configuration, the first device 110 may apply a TDRA list provided in PDSCH-Config-Common configuration and apply it for only those DCIs with CRC scrambled using G-RNTI or G-CS-RNTI for multicast and broadcast.

Return to block 320, if determining that the PDSCH-Config configuration is used, the process 300B proceeds to block 323. At block 323, the first device 110 may determine whether the identifier is a predetermined identifier. In other words, the first device 110 may determine whether the DCI is scrambled by the predetermined identifier. For example, the first device 110 may determine whether CRC of the DCI is scrambled by the predetermined identifier. In some embodiments, the predetermined identifier may be a G-RNTI. In some embodiments, the predetermined identifier may be a G-CS-RNTI. Of course, the predetermined identifier may adopt any other suitable forms.

If the identifier is the predetermined identifier, the process 300B proceeds to block 324. At block 324, the first device 110 may determine the TDRA list from the PDSCH-Config configuration. In other words, if the first device 110 is not configured with PDSCH-Config-Multicast configuration, the first device 110 may apply a TDRA list provided in PDSCH-Config configuration and apply it for only those DCIs with CRC scrambled using G-RNTI or G-CS-RNTI for multicast and broadcast. In some embodiments, the predetermined identifier may be associated with multicast traffic. In some embodiments, the predetermined identifier may be associated with broadcast traffic.

In this way, the TDRA list to be used may be determined in an optimal manner, with all the UEs receiving the multicast and broadcast traffic determining common values for the time domain resources where the data traffic would be scheduled.

Embodiment 3

This embodiment is another modification of Embodiment 1. This embodiment provides an alternative for blocks 304 to 305 of FIG. 3A. The details of this embodiment will be described with reference to FIG. 3C.

Figure 3C:
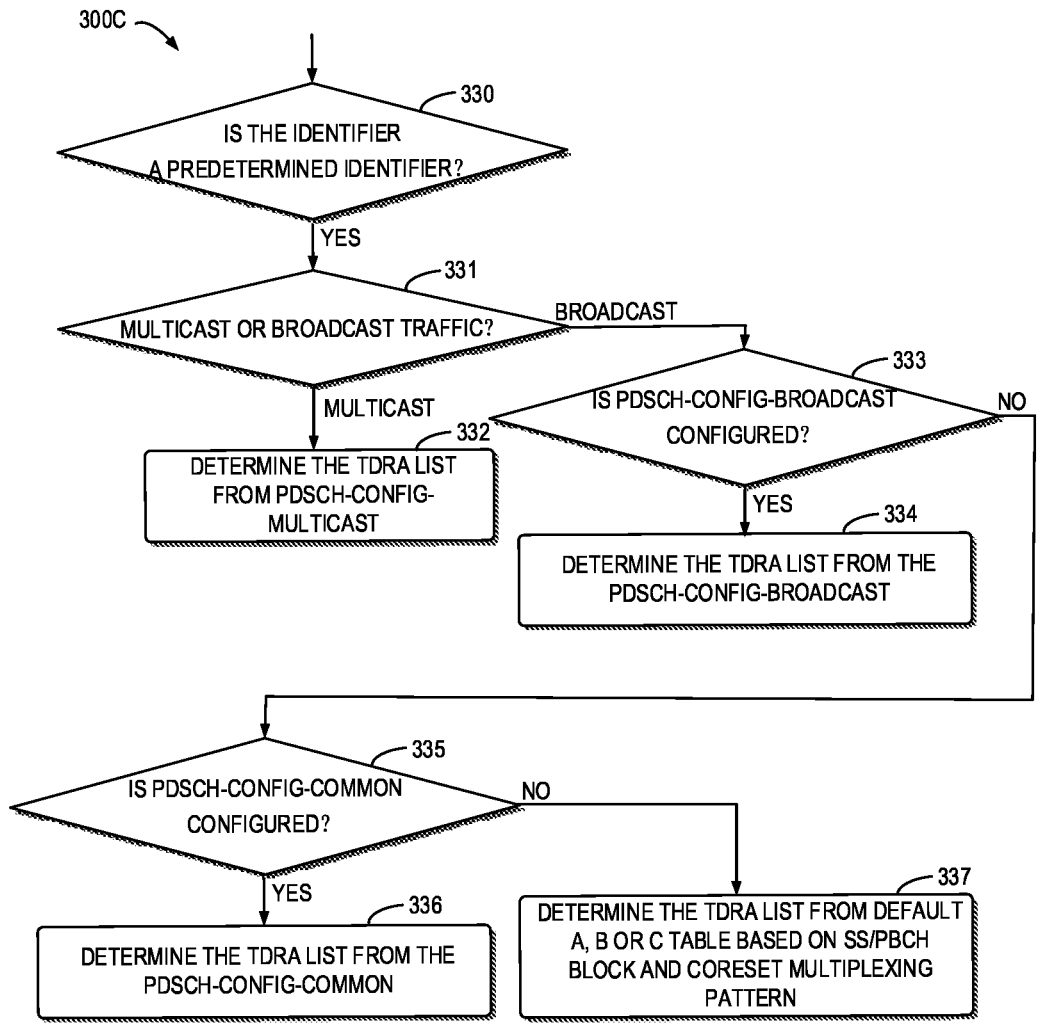
FIG. 3C illustrates a flowchart illustrating still another method of determining a TDRA list according to example embodiments of the present disclosure.

FIG. 3C illustrates a flowchart illustrating still another method 300C of determining a TDRA list according to example embodiments of the present disclosure. The method 300C can be implemented at the first device 110 or the second device 120 shown in FIG. 1. For the purpose of discussion, the method 300C will be described in connection with the first device 110 in FIG. 1. It is to be understood that the method 300C may also be implemented at the second device 120. It is also to be understood that the method 300C may further include additional blocks not shown and/or omit some shown blocks, and the scope of the present disclosure is not limited in this regard.

If determining at block 303 in FIG. 3A that the PDSCH-Config-Multicast configuration (i.e., the first configuration) is configured, the process 300C may start.

As shown in FIG. 3C, at block 330, the first device 110 may determine whether the identifier is a predetermined identifier. In other words, the first device 110 may determine whether the DCI is scrambled by the predetermined identifier. For example, the first device 110 may determine whether CRC of the DCI is scrambled by the predetermined identifier.

In some embodiments, the predetermined identifier may be a G-RNTI. In some embodiments, the predetermined identifier may be a G-CS-RNTI. Of course, the predetermined identifier may adopt any other suitable forms.

If the identifier is the predetermined identifier, the process 300C proceeds to block 331. At block 331, the first device 110 may determine whether the predetermined identifier is associated with multicast traffic or broadcast traffic.

If the predetermined identifier is associated with multicast traffic, the process 300C proceeds to block 332. At block 332, the first device 110 may determine the TDRA list from the PDSCH-Config-Multicast configuration.

Return to block 331, if the predetermined identifier is associated with broadcast traffic, the process 300C proceeds to block 333. At block 333, the first device 110 may determine whether a PDSCH-Config-Broadcast configuration (for convenience, also referred to as a sixth configuration herein) is configured.

If the PDSCH-Config-Broadcast configuration is configured, the process 300C proceeds to block 334. At block 334, the first device 110 may determine the TDRA list from the PDSCH-Config-Broadcast configuration.

Return to block 333, if determining that the PDSCH-Config-Broadcast configuration is not configured, the process 300C proceeds to block 335. At block 335, the first device 110 may determine whether a PDSCH-Config-Common configuration (i.e., the second configuration) is configured.

If the PDSCH-Config-Common configuration is configured, the process 300C proceeds to block 336. At block 336, the first device 110 may determine the TDRA list from the PDSCH-Config-Common configuration.

If determining at block 335 that the PDSCH-Config-Common configuration is not configured, the process 300C proceeds to block 337. At block 337, the first device 110 may determine the TDRA list from a set of default A, B and C tables (i.e., the fourth configuration) based on a SS/PBCH block and CORESET multiplexing pattern. For example, the first device 110 may determine the TDRA list from the default A, B or C table based on a SS/PBCH block and CORESET multiplexing pattern.

In this way, the TDRA list to be used may be determined in an optimal manner, with all the UEs receiving the multicast and broadcast traffic determining common values for the time domain resources where the data traffic would be scheduled.

According to embodiments of the present disclosure, Table 1 may be updated as Table 2 below.

TABLE 2

An example of applicable PDSCH time domain resource allocation for DCI formats 1_0 and 1_1

| RNTI | PDCCH search space | SS/PBCH block and CORESET multiplexing pattern | PDSCH-ConfigCommon includes pdsch-TimeDomainAl-locationList | PDSCH-Config includes pdsch-TimeDomainAl-locationList | PDSCH time domain resource allocation to apply |
|---|---|---|---|---|---|
| SI-RNTI | Type0 common | 1 | — | — | Default A for normal CP |
|  |  | 2 | — | — | Default B |
|  |  | 3 | — | — | Default C |
| SI-RNTI | Type0A common | 1 | No | — | Default A |
|  |  | 2 | No | — | Default B |
|  |  | 3 | No | — | Default C |
|  |  | 1, 2, 3 | Yes | — | pdsch-TimeDomainAl-locationList provided in PDSCH-ConfigCommon |
| RA-RNTI, MSGB-RNTI, TC-RNTI | Type1 common | 1, 2, 3 | No | — | Default A |
|  |  | 1, 2, 3 | Yes | — | pdsch-TimeDomainAl-locationList provided in PDSCH-ConfigCommon |
| P-RNTI | Type2 common | 1 | No | — | Default A |
|  |  | 2 | No | — | Default B |
|  |  | 3 | No | — | Default C |
|  |  | 1, 2, 3 | Yes | — | pdsch-TimeDomainAl-locationList provided in PDSCH-ConfigCommon |
| G-RNTI, GS-RNTI | Type X common for broadcast | 1 | No | — | Default A |
|  |  | 2 | No | — | Default B |
|  |  | 3 | No | — | Default C |
|  |  | 1, 2, 3 | No/Yes | Yes (PDSCH-Config-Broadcast) | pdsch-TimeDomainAl-locationList provided in PDSCH-Config-Broadcast |
|  |  | 1, 2, 3 | No/Yes | No | pdsch-TimeDomainAl-locationList provided in PDSCH-ConfigCommon |
| C-RNTI, MCS-C-RNTI, CS-RNTI | Any common search space associated with CORESET 0 | 1, 2, 3 | No | — | Default A |
|  |  | 1, 2, 3 | Yes | — | pdsch-TimeDomainAl-locationList provided in PDSCH-ConfigCommon |
| C-RNTI, MCS-C-RNTI, CS-RNTI | Any common search space not associated with CORESET 0 | 1, 2, 3 | No | No | Default A |
|  |  | 1, 2, 3 | Yes | No | pdsch-TimeDomainAl-locationList provided in PDSCH-ConfigCommon |
|  | UE specific search space | 1, 2, 3 | No/Yes | Yes | pdsch-TimeDomainAl-locationList provided in PDSCH-Config |
| G-RNTI, G-CS-RNTI | Type-X common search space for multicast | 1, 2, 3 | No | No | pdsch-TimeDomainAl-locationList provided in PDSCH-Config-Multicast or if not configured Default A |
|  |  | 1, 2, 3 | Yes | No | pdsch-TimeDomainAl-locationList provided in PDSCH-ConfigCommon |
|  |  | 1, 2, 3 | No/Yes | Yes | pdsch-TimeDomainAl-locationList provided in PDSCH-Config |
|  |  | 1, 2, 3 | No/Yes | No/Yes | pdsch-TimeDomainAl-locationList provided in PDSCH-Config-Multicast |

Corresponding to the above process described in FIGS. 2 to 3C, embodiments of the present disclosure provide methods of communication implemented at a first device and at a second device. These methods will be described below with reference to FIGS. 4 to 5. However, those skilled in the art would readily appreciate that the detailed description given herein with respect to these figures is for explanatory purpose as the present disclosure extends beyond theses limited embodiments.

Figure 4:
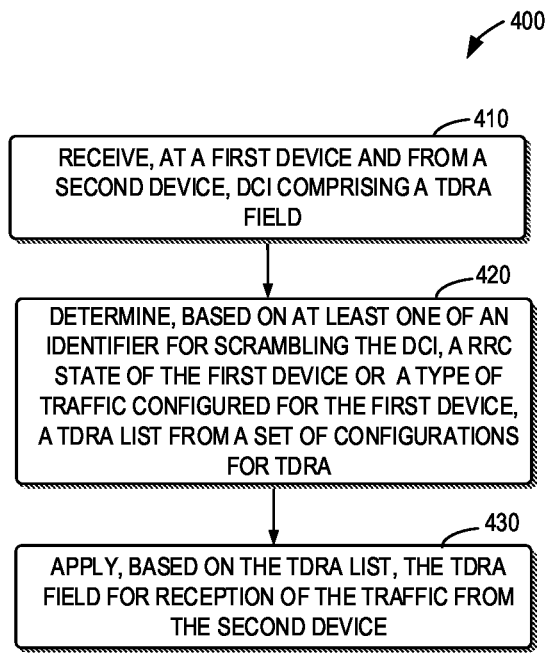
FIG. 4 illustrates a flowchart illustrating a method of communication implemented at a first device according to example embodiments of the present disclosure.

FIG. 4 illustrates a flowchart of a method 400 of communication implemented at a first device according to example embodiments of the present disclosure. The method 400 can be implemented at the first device 110 shown in FIG. 1. For the purpose of discussion, the method 400 will be described with reference to FIG. 1. It is to be understood that method 400 may further include additional blocks not shown and/or omit some shown blocks, and the scope of the present disclosure is not limited in this regard.

As shown in FIG. 4, at block 410, the first device 110 receives, from the second device 120, DCI comprising a TDRA field.

At block 420, the first device 110 determines, based on at least one of an identifier for scrambling the DCI, a RRC of the first device 110 or a type of traffic configured for the first device 110, a TDRA list from a set of configurations for TDRA.

In some embodiments, the RRC state of the first device 110 may be one of a connected state, idle state and inactive sate. In some embodiments, the type of traffic is at least one of broadcast traffic, multicast traffic or unicast traffic.

In some embodiments, if the first device 110 is in a connected state and the type of traffic is at least broadcast and multicast traffic, the first device 110 may determine whether a first configuration (for example, PDSCH-Config-Multicast configuration) is configured for the first device 110. If the first configuration is configured for the first device 110, the first device 110 may determine whether the identifier is a predetermined identifier. If the identifier is the predetermined identifier, the first device 110 may determine the TDRA list from the first configuration.

In some embodiments, if the first configuration is not configured for the first device 110, the first device 110 may determine whether a second configuration (for example, PDSCH-Config-Common configuration) is not configured for the first device 110. If the second configuration is configured for the first device 110, the first device 110 may determine whether the identifier is a predetermined identifier. If the identifier is the predetermined identifier, the first device 110 may determine the TDRA list from the second configuration.

In some embodiments, if the second configuration is not configured for the first device 110, the first device 110 may determine whether the identifier is a predetermined identifier. If the identifier is the predetermined identifier, the first device 110 may determine whether the predetermined identifier is associated with multicast traffic or broadcast traffic. If the predetermined identifier is associated with multicast traffic, the first device 110 may determine the TDRA list from a third configuration (for example, default A table). If the predetermined identifier is associated with broadcast traffic, the first device 110 may determine the TDRA list from a fourth configuration (for example, a set of default A, B and C tables) based on a SS/PBCH block and CORESET multiplexing pattern.

In some embodiments, the first device 110 may receive, from the second device 120, an indication indicating whether a second configuration (for example, PDSCH-Config-Common configuration) or a fifth configuration (for example, PDSCH-Config configuration) is used for the determination of the TDRA list.

In these embodiments, if the first configuration is not configured for the first device 110, the first device 110 may determine, based on the indication, whether the second configuration or the fourth configuration is used. If the second configuration is used, the first device 110 may determine whether the identifier is a predetermined identifier. If the identifier is the predetermined identifier, the first device 120 may determine the TDRA list from the second configuration. In some embodiments, if the fifth configuration is used, the first device 110 may determine whether the identifier is a predetermined identifier. If the identifier is the predetermined identifier, the first device 110 may determine the TDRA list from the fifth configuration.

In some embodiments, if the first device 110 is in a connected state and the type of traffic is at least broadcast and multicast traffic, the first device 110 may determine whether a first configuration (for example, PDSCH-Config-Multicast configuration) is configured for the first device 110. If the first configuration is configured for the first device 110, the first deice 110 may determine whether the identifier is a predetermined identifier. If the identifier is the predetermined identifier, the first device 110 may determine whether the predetermined identifier is associated with multicast traffic or broadcast traffic. If the predetermined identifier is associated with multicast traffic, the first device 110 may determine the TDRA list from the first configuration. If the predetermined identifier is associated with broadcast traffic, the first device 110 may determine whether a sixth configuration (for example, PDSCH-Config-Broadcast configuration) is configured for the first device 110. If the sixth configuration is configured for the first device 110, the first device 110 may determine the TDRA list from the sixth configuration.

In some embodiments, if the sixth configuration is not configured for the first device 110, the first device 120 may determine whether a second configuration is configured for the first device 110. If the second configuration is configured for the first device 110, the first device 110 may determine the TDRA list from the second configuration. If the second configuration is not configured for the first device 110, the first device 110 may determine the TDRA list from a fourth configuration (for example, a set of default A, B and C tables) based on a SS/PBCH block and CORESET multiplexing pattern.

Upon determination of the TDRA list, at block 430, the first device 110 applies, based on the TDRA list, the TDRA field for reception of the traffic from the second device 120.

With the method 400, a terminal device in a connected state receiving multicast/unicast and broadcast traffic and a terminal device receiving only broadcast traffic may be enabled to interpret a common TDRA list to be used. Accordingly, a significant complexity reduction to a terminal device may be provided.

Figure 5:
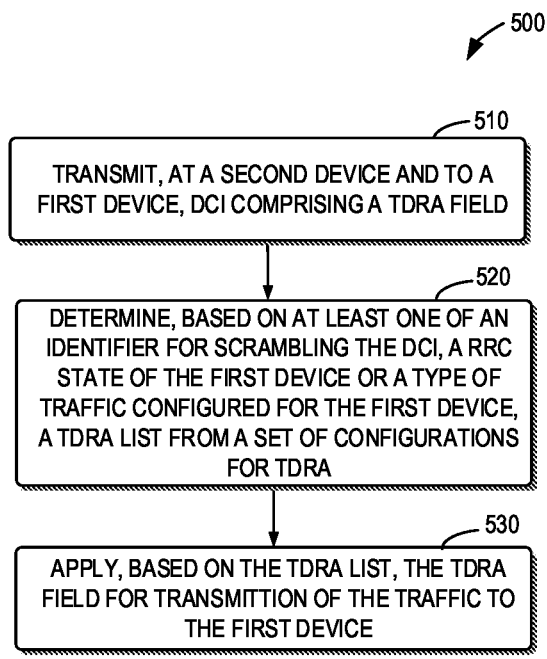
FIG. 5 illustrates a flowchart illustrating a method of communication implemented at a second device according to example embodiments of the present disclosure.

Correspondingly, embodiments of the present disclosure also provide a method of communication implemented at a second device. FIG. 5 illustrates a flowchart of a method 500 of communication implemented at a second device according to example embodiments of the present disclosure. The method 500 can be implemented at the second device 120 shown in FIG. 1. For the purpose of discussion, the method 500 will be described with reference to FIG. 1. It is to be understood that method 500 may further include additional blocks not shown and/or omit some shown blocks, and the scope of the present disclosure is not limited in this regard.

As shown in FIG. 5, at block 510, the second device 120 transmits, to the first device 110, DCI comprising a TDRA field.

At block 520, the second device 120 determines, based on at least one of an identifier for scrambling the DCI, a RRC of the first device 110 or a type of traffic configured for the first device 110, a TDRA list from a set of configurations for TDRA.

In some embodiments, the RRC state of the first device 110 may be one of a connected state, idle state and inactive sate. In some embodiments, the type of traffic is at least one of broadcast traffic, multicast traffic or unicast traffic.

In some embodiments, if the first device 110 is in a connected state and the type of traffic is at least broadcast and multicast traffic, the second device 120 may determine whether a first configuration (for example, PDSCH-Config-Multicast configuration) is configured for the first device 110. If the first configuration is configured for the first device 110, the second device 120 may determine whether the identifier is a predetermined identifier. If the identifier is the predetermined identifier, the first device 110 may determine the TDRA list from the first configuration.

In some embodiments, if the first configuration is not configured for the first device 110, the second device 120 may determine whether a second configuration (for example, PDSCH-Config-Common configuration) is not configured for the first device 110. If the second configuration is configured for the first device 110, the second device 120 may determine whether the identifier is a predetermined identifier. If the identifier is the predetermined identifier, the second device 120 may determine the TDRA list from the second configuration.

In some embodiments, if the second configuration is not configured for the first device 110, the second device 120 may determine whether the identifier is a predetermined identifier. If the identifier is the predetermined identifier, the second device 120 may determine whether the predetermined identifier is associated with multicast traffic or broadcast traffic. If the predetermined identifier is associated with multicast traffic, the second device 120 may determine the TDRA list from a third configuration (for example, default A table). If the predetermined identifier is associated with broadcast traffic, the second device 120 may determine the TDRA list from a fourth configuration (for example, a set of default A, B and C tables) based on a SS/PBCH block and CORESET multiplexing pattern.

In some embodiments, the second device 120 may transmit, to the first device 110, an indication indicating whether a second configuration (for example, PDSCH-Config-Common configuration) or a fifth configuration (for example, PDSCH-Config configuration) is used for the determination of the TDRA list.

In these embodiments, if the first configuration is not configured for the first device 110, the second device 120 may determine, based on the indication, whether the second configuration or the fourth configuration is used. If the second configuration is used, the second device 120 may determine whether the identifier is a predetermined identifier. If the identifier is the predetermined identifier, the second device 120 may determine the TDRA list from the second configuration. In some embodiments, if the fifth configuration is used, the second device 120 may determine whether the identifier is a predetermined identifier. If the identifier is the predetermined identifier, the second device 120 may determine the TDRA list from the fifth configuration.

In some embodiments, if the first device 110 is in a connected state and the type of traffic is at least broadcast and multicast traffic, the second device 120 may determine whether a first configuration (for example, PDSCH-Config-Multicast configuration) is configured for the first device 110. If the first configuration is configured for the first device 110, the second device 120 may determine whether the identifier is a predetermined identifier. If the identifier is the predetermined identifier, the second device 120 may determine whether the predetermined identifier is associated with multicast traffic or broadcast traffic. If the predetermined identifier is associated with multicast traffic, the second device 120 may determine the TDRA list from the first configuration. If the predetermined identifier is associated with broadcast traffic, the second device 120 may determine whether a sixth configuration (for example, PDSCH-Config-Broadcast configuration) is configured for the first device 110. If the sixth configuration is configured for the first device 110, the second device 120 may determine the TDRA list from the sixth configuration.

In some embodiments, if the sixth configuration is not configured for the first device 110, the second device 120 may determine whether a second configuration is configured for the first device 110. If the second configuration is configured for the first device 110, the second device 120 may determine the TDRA list from the second configuration. If the second configuration is not configured for the first device 110, the second device 120 may determine the TDRA list from a fourth configuration (for example, a set of default A, B and C tables) based on a SS/PBCH block and CORESET multiplexing pattern.

Upon determination of the TDRA list, at block 530, the second device 120 applies, based on the TDRA list, the TDRA field for transmission of the traffic to the first device 110.

With the method 500, a terminal device in a connected state receiving multicast/unicast and broadcast traffic and a terminal device receiving only broadcast traffic may be enabled to interpret a common TDRA list to be used. Accordingly, a significant flexibility to schedule MBS may be provided.

The operations in the methods of FIGS. 4 and 5 correspond to that in the process described in FIG. 2, and thus other details are omitted here.

In some embodiments, an apparatus (for example, the first device 110) capable of performing the method 400 may comprise means for performing the respective steps of the method 400. The means may be implemented in any suitable form. For example, the means may be implemented in a circuitry or software module.

In some embodiments, the apparatus may comprise: means for receiving, at a first device and from a second device, downlink control information comprising a time domain resource allocation field; means for determining, based on at least one of an identifier for scrambling the downlink control information, a radio resource control state of the first device or a type of traffic configured for the first device, a time domain resource allocation list from a set of configurations for time domain resource allocation; and means for applying, based on the time domain resource allocation list, the time domain resource allocation field for reception of the traffic from the second device.

In some embodiments, the radio resource control state of the first device is one of a connected state, idle state and inactive sate, and the type of traffic is at least one of broadcast traffic, multicast traffic or unicast traffic.

In some embodiments, the means for determining the time domain resource allocation list comprises means for: in accordance with a determination that the first device is in a connected state and the type of traffic is at least broadcast and multicast traffic, determining whether a first configuration is configured for the first device; in accordance with a determination that the first configuration is configured for the first device, determining whether the identifier is a predetermined identifier; and in accordance with a determination that the identifier is the predetermined identifier, determining the time domain resource allocation list from the first configuration.

In some embodiments, the means for determining the time domain resource allocation list further comprises means for: in accordance with a determination that the first configuration is not configured for the first device, determining whether a second configuration is not configured for the first device; in accordance with a determination that the second configuration is configured for the first device, determining whether the identifier is a predetermined identifier; and in accordance with a determination that the identifier is the predetermined identifier, determining the time domain resource allocation list from the second configuration.

In some embodiments, the means for determining the time domain resource allocation list further comprises means for: in accordance with a determination that the second configuration is not configured for the first device, determining whether the identifier is a predetermined identifier; in accordance with a determination that the identifier is the predetermined identifier, determining whether the predetermined identifier is associated with multicast traffic or broadcast traffic; in accordance with a determination that the predetermined identifier is associated with multicast traffic, determining the time domain resource allocation list from a third configuration; and in accordance with a determination that the predetermined identifier is associated with broadcast traffic, determining the time domain resource allocation list from a fourth configuration based on a synchronization signal/physical broadcast channel block and control resource set multiplexing pattern.

In some embodiments, the apparatus may further comprise means for receiving, from the second device, an indication indicating whether a second configuration or a fifth configuration is used for the determination of the time domain resource allocation list.

In these embodiments, the means for determining the time domain resource allocation list may further comprise means for: in accordance with a determination that the first configuration is not configured for the first device, determining, based on the indication, whether the second configuration or the fourth configuration is used; in accordance with a determination that the second configuration is used, determining whether the identifier is a predetermined identifier; and in accordance with a determination that the identifier is the predetermined identifier, determining the time domain resource allocation list from the second configuration.

In some embodiments, the means for determining the time domain resource allocation list may further comprise means for: in accordance with a determination that the fifth configuration is used, determining whether the identifier is a predetermined identifier; and in accordance with a determination that the identifier is the predetermined identifier, determining the time domain resource allocation list from the fifth configuration.

In some embodiments, the means for determining the time domain resource allocation list may comprise means for: in accordance with a determination that the first device is in a connected state and the type of traffic is at least broadcast and multicast traffic, determining whether a first configuration is configured for the first device; in accordance with a determination that the first configuration is configured for the first device, determining whether the identifier is a predetermined identifier; in accordance with a determination that the identifier is the predetermined identifier, determining whether the predetermined identifier is associated with multicast traffic or broadcast traffic; in accordance with a determination that the predetermined identifier is associated with multicast traffic, determining the time domain resource allocation list from the first configuration; in accordance with a determination that the predetermined identifier is associated with broadcast traffic, determining whether a sixth configuration is configured for the first device; and in accordance with a determination that the sixth configuration is configured for the first device, determining the time domain resource allocation list from the sixth configuration.

In some embodiments, the means for determining the time domain resource allocation list may further comprise means for: in accordance with a determination that the sixth configuration is not configured for the first device, determining whether a second configuration is configured for the first device; in accordance with a determination that the second configuration is configured for the first device, determining the time domain resource allocation list from the second configuration; and in accordance with a determination that the second configuration is not configured for the first device, determining the time domain resource allocation list from a fourth configuration based on a synchronization signal/physical broadcast channel block and control resource set multiplexing pattern.

In some embodiments, the first device is a terminal device, and the second device is a network device. In some embodiments, the first configuration is a PDSCH-Config-Multicast configuration, the second configuration is a PDSCH-ConfigCommon configuration, the third configuration is a default A table, the fourth configuration is a set of default A, B and C tables, the fifth configuration is a PDSCH-Config configuration, and the sixth configuration is a PDSCH-Config-Broadcast configuration.

In some embodiments, an apparatus (for example, the second device 120) capable of performing the method 500 may comprise means for performing the respective steps of the method 500. The means may be implemented in any suitable form. For example, the means may be implemented in a circuitry or software module.

In some embodiments, the apparatus may comprise: means for transmitting, at a second device and to a first device, downlink control information comprising a time domain resource allocation field; means for determining, based on at least one of an identifier for scrambling the downlink control information, a radio resource control state of the first device or a type of traffic configured for the first device, a time domain resource allocation list from a set of configurations for time domain resource allocation; and means for applying, based on the time domain resource allocation list, the time domain resource allocation field for transmission of the traffic to the first device.

In some embodiments, the radio resource control state of the first device is one of a connected state, idle state and inactive sate, and the type of traffic is at least one of broadcast traffic, multicast traffic or unicast traffic.

In some embodiments, the means for determining the time domain resource allocation list comprises means for: in accordance with a determination that the first device is in a connected state and the type of traffic is at least broadcast and multicast traffic, determining whether a first configuration is configured for the first device; in accordance with a determination that the first configuration is configured for the first device, determining whether the identifier is a predetermined identifier; and in accordance with a determination that the identifier is the predetermined identifier, determining the time domain resource allocation list from the first configuration.

In some embodiments, the means for determining the time domain resource allocation list further comprises means for: in accordance with a determination that the first configuration is not configured for the first device, determining whether a second configuration is not configured for the first device; in accordance with a determination that the second configuration is configured for the first device, determining whether the identifier is a predetermined identifier; and in accordance with a determination that the identifier is the predetermined identifier, determining the time domain resource allocation list from the second configuration.

In some embodiments, the means for determining the time domain resource allocation list further comprises means for: in accordance with a determination that the second configuration is not configured for the first device, determining whether the identifier is a predetermined identifier; in accordance with a determination that the identifier is the predetermined identifier, determining whether the predetermined identifier is associated with multicast traffic or broadcast traffic; in accordance with a determination that the predetermined identifier is associated with multicast traffic, determining the time domain resource allocation list from a third configuration; and in accordance with a determination that the predetermined identifier is associated with broadcast traffic, determining the time domain resource allocation list from a fourth configuration based on a synchronization signal/physical broadcast channel block and control resource set multiplexing pattern.

In some embodiments, the apparatus may further comprise means for receiving, from the second device, an indication indicating whether a second configuration or a fifth configuration is used for the determination of the time domain resource allocation list.

In these embodiments, the means for determining the time domain resource allocation list may further comprise means for: in accordance with a determination that the first configuration is not configured for the first device, determining, based on the indication, whether the second configuration or the fourth configuration is used; in accordance with a determination that the second configuration is used, determining whether the identifier is a predetermined identifier; and in accordance with a determination that the identifier is the predetermined identifier, determining the time domain resource allocation list from the second configuration.

In some embodiments, the means for determining the time domain resource allocation list may further comprise means for: in accordance with a determination that the fifth configuration is used, determining whether the identifier is a predetermined identifier; and in accordance with a determination that the identifier is the predetermined identifier, determining the time domain resource allocation list from the fifth configuration.

In some embodiments, the means for determining the time domain resource allocation list may comprise means for: in accordance with a determination that the first device is in a connected state and the type of traffic is at least broadcast and multicast traffic, determining whether a first configuration is configured for the first device; in accordance with a determination that the first configuration is configured for the first device, determining whether the identifier is a predetermined identifier; in accordance with a determination that the identifier is the predetermined identifier, determining whether the predetermined identifier is associated with multicast traffic or broadcast traffic; in accordance with a determination that the predetermined identifier is associated with multicast traffic, determining the time domain resource allocation list from the first configuration; in accordance with a determination that the predetermined identifier is associated with broadcast traffic, determining whether a sixth configuration is configured for the first device; and in accordance with a determination that the sixth configuration is configured for the first device, determining the time domain resource allocation list from the sixth configuration.

In some embodiments, the means for determining the time domain resource allocation list may further comprise means for: in accordance with a determination that the sixth configuration is not configured for the first device, determining whether a second configuration is configured for the first device; in accordance with a determination that the second configuration is configured for the first device, determining the time domain resource allocation list from the second configuration; and in accordance with a determination that the second configuration is not configured for the first device, determining the time domain resource allocation list from a fourth configuration based on a synchronization signal/physical broadcast channel block and control resource set multiplexing pattern.

In some embodiments, the first device is a terminal device, and the second device is a network device. In some embodiments, the first configuration is a PDSCH-Config-Multicast configuration, the second configuration is a PDSCH-ConfigCommon configuration, the third configuration is a default A table, the fourth configuration is a set of default A, B and C tables, the fifth configuration is a PDSCH-Config configuration, and the sixth configuration is a PDSCH-Config-Broadcast configuration.

Figure 6:
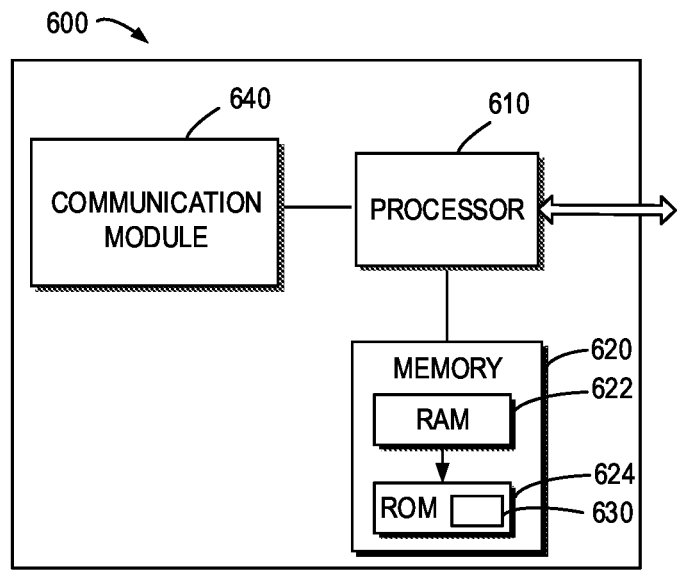
FIG. 6 illustrates a simplified block diagram of an apparatus that is suitable for implementing example embodiments of the present disclosure.

FIG. 6 is a simplified block diagram of a device 600 that is suitable for implementing embodiments of the present disclosure. The device 600 may be provided to implement the first device or the second device, for example the first device 110 or the second device 120 as shown in FIG. 1. As shown, the device 600 includes one or more processors 610, one or more memories 620 coupled to the processor 610, and one or more communication modules 640 (such as, transmitters and/or receivers) coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable action and processing by loading the program 630 into the RAM 622.

The embodiments of the present disclosure may be implemented by means of the program 630 so that the device 600 may perform any process of the disclosure as discussed with reference to FIGS. 1 to 5. The embodiments of the present disclosure may also be implemented by hardware or by a combination of software and hardware.

Figure 7:
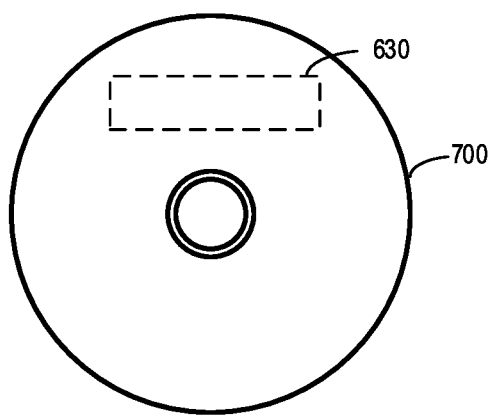
FIG. 7 illustrates a block diagram of an example computer readable medium in accordance with example embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   the at least one memory and the computer program code configured to, with the at
   least one processor, cause the first device to:
   receive, from a second device, downlink control information comprising a time domain resource allocation field;
   determine, based on at least one of an identifier for scrambling the downlink control information, a type of search space, a radio resource control state of the first device, or a type of traffic configured for the first device, a time domain resource allocation list from a set of configurations for time domain resource allocation, wherein the first device is caused to determine the time domain resource allocation list by:
   if an identifier is a predetermined identifier, the predetermined identifier is associated with multicast traffic, and a first configuration is configured for the first device, determining the time domain resource allocation list from the first configuration; or
   if an identifier is a predetermined identifier, the predetermined identifier is associated with broadcast traffic, and a sixth configuration is configured for the first device, determining the time domain resource allocation list from the sixth configuration; and
   apply the time domain resource allocation list according to the time domain resource allocation field for reception of traffic from the second device.

2. The first device of claim 1, wherein the radio resource control state of the first device is one of a connected state, an idle state, or an inactive state, and
   wherein the type of traffic is at least one of broadcast traffic, multicast traffic or unicast traffic.

3. The first device of claim 1, wherein the first device is caused to determine the time domain resource allocation list by:

if the first device is in a connected state and the type of traffic is at least broadcast and multicast traffic, determining whether a first configuration is configured for the first device;

if the first configuration is configured for the first device, determining whether the identifier is a predetermined identifier; and if the identifier is the predetermined identifier, determining the time domain resource allocation list from the first configuration.

4. The first device of claim 3, wherein the first device is further caused to determine the time domain resource allocation list by:

if the first configuration is not configured for the first device, determining whether a second configuration is not configured for the first device;

if the second configuration is configured for the first device, determining whether the identifier is a predetermined identifier; and if the identifier is the predetermined identifier, determining the time domain resource allocation list from the second configuration.

5. The first device of claim 4, wherein the first device is further caused to determine the time domain resource allocation list by:

if the second configuration is not configured for the first device, determining whether the identifier is a predetermined identifier;

if the identifier is the predetermined identifier, determining whether the predetermined identifier is associated with multicast traffic or broadcast traffic; and if the predetermined identifier is associated with multicast traffic, determining the time domain resource allocation list from a third configuration; or if the predetermined identifier is associated with broadcast traffic, determining the time domain resource allocation list from a fourth configuration based on a synchronization signal/physical broadcast channel block and control resource set multiplexing pattern.

6. The first device of claim 3, wherein the first device is further caused to:

receive, from the second device, an indication indicating whether a second configuration or a fifth configuration is used for the determination of the time domain resource allocation list.

7. The first device of claim 6, wherein the first device is further caused to determine the time domain resource allocation list by:

if the first configuration is not configured for the first device, determining, based on the indication, whether the second configuration or the fourth configuration is used;

if the second configuration is used, determining whether the identifier is a predetermined identifier; and if the identifier is the predetermined identifier, determining the time domain resource allocation list from the second configuration.

8. The first device of claim 7, wherein the first device is further caused to determine the time domain resource allocation list by:

if the fifth configuration is used, determining whether the identifier is a predetermined identifier; and if the identifier is the predetermined identifier, determining the time domain resource allocation list from the fifth configuration.

9. The first device of claim 1, wherein the first device is caused to determine the time domain resource allocation list by:

if an identifier is a predetermined identifier, the predetermined identifier is associated with broadcast traffic, a sixth configuration is not configured for the first device, and a second configuration is configured for the first device, applying the time domain resource allocation list from the second configuration; or if an identifier is a predetermined identifier, the predetermined identifier is associated with broadcast traffic, a sixth configuration is not configured for the first device, and a second configuration is not configured for the first device, applying the time domain resource allocation list from a fourth configuration based on a synchronization signal/physical broadcast channel block and control resource set multiplexing pattern.

10. The first device of claim 9, wherein the first configuration is a PDSCH-Config-Multicast configuration, the second configuration is a PDSCH-ConfigCommon configuration, a third configuration is a default A table, the fourth configuration is a set of default A, B and C tables, the fifth configuration is a PDSCH-Config configuration.

11. The first device of claim 1, wherein the sixth configuration is a PDSCH-Config-Broadcast configuration.

12. The first device of claim 1, wherein the first device is a terminal device, and the second device is a network device.

13. A second device comprising:
at least one processor; and
at least one memory including computer program code;
the at least one memory and the computer program code configured to, with the at
least one processor, cause the second device to:
transmit, to a first device, downlink control information comprising a time domain
resource allocation field;
configure, based on at least one of an identifier for scrambling the downlink control
information, a type of search space, a radio resource control state of the first device, or a type of traffic configured for the first device, a time domain resource allocation list from a set of configurations for
time domain resource allocation; and
apply the time domain resource allocation list according to the time domain resource
allocation field for transmission of traffic to the first device, wherein the second device is further caused to determine the time domain resource allocation list by:

if an identifier is a predetermined identifier, the predetermined identifier is associated with multicast traffic, and a first configuration is configured for the first device, determining the time domain resource allocation list from the first configuration; or if an identifier is a predetermined identifier, the predetermined identifier is associated with broadcast traffic, and a sixth configuration is configured for the first device, determining the time domain resource allocation list from the sixth configuration.

14. The second device of claim 13, wherein the radio resource control state of the first device is one of a connected state, an idle state, or an inactive state, and
wherein the type of traffic is at least one of broadcast traffic, multicast traffic or unicast traffic.

15. The second device of claim 13, wherein the second device is further caused to determine the time domain resource allocation list by:

if an identifier is a predetermined identifier, the predetermined identifier is associated with broadcast traffic, a sixth configuration is not configured for the first device, and a second configuration is configured for the first device, applying the time domain resource allocation list from the second configuration; or if an identifier is a predetermined identifier, the predetermined identifier is associated with broadcast traffic, a sixth configuration is not configured for the first device, and a second configuration is not configured for the first device, applying the time domain resource allocation list from a fourth configuration based on a synchronization signal/physical broadcast channel block and control resource set multiplexing pattern.

16. The second device of claim 15, wherein the first configuration is a PDSCH-Config-Multicast configuration, the second configuration is a PDSCH-ConfigCommon configuration, a third configuration is a default A table, the fourth configuration is a set of default A, B and C tables, the fifth configuration is a PDSCH-Config configuration.

17. The second device of claim 13, wherein the sixth configuration is a PDSCH-Config-Broadcast configuration.

18. The second device of claim 13, wherein the first device is a terminal device, and the second device is a network device.

* * * * *